Nov. 18, 1958 A. J. MEYERHOFF 2,861,259

BALANCED LOGICAL MAGNETIC CIRCUITS

Filed Dec. 31, 1954 2 Sheets-Sheet 1

INVENTOR.
ALBERT J. MEYERHOFF

BY Laurence R. Brown

ATTORNEY

BALANCED LOGICAL MAGNETIC CIRCUITS

Filed Dec. 31, 1954 2 Sheets-Sheet 2

*INVENTOR.*
ALBERT J. MEYERHOFF
*BY*
Lawrence R. Brown
ATTORNEY

United States Patent Office 2,861,259

Patented Nov. 18, 1958

2,861,259

BALANCED LOGICAL MAGNETIC CIRCUITS

Albert J. Meyerhoff, Wynnewood, Pa., assignor to Burroughs Corporation, Detroit, Mich., a corporation of Michigan Application December 31, 1954, Serial No. 479,061

5 Claims. (Cl. 340—174)

This invention relates to bistable state magnetic storage devices and more particularly to logical magnetic circuits incorporating a plurality of interconnected magnetic storage devices.

Binary magnetic devices are well known and have been used for both storage and logical operations. In general magnetic cores are used which present a rectangular hysteresis characteristic. In practice the magnetic cores are not truly rectangular, however. Such cores, after being driven into magnetic saturation, return to a remanence condition at a different position upon the hysteresis curve. When driven from a remanence condition of one polarity into saturation of the same polarity, the cores develop a small potential in windings thereabout. However, when the cores are switched from one remanence condition to an opposite saturation they develop a large potential in windings about the cores. Thus, the storage condition of the core may be interrogated by driving it to saturation in a predetermined direction, and the potential developed at an output winding will be high or low depending upon the previous storage core condition.

By combining several magnetic cores in a circuit, different logical operations may be performed. In general a sequence of storage and interrogation or shifting operations is produced to lodge the stored result indicative of a predetermined logic in a particular core. Circuits for performing logic in this way have been heretofore developed. However, because of the departure of the cores from true rectangular hysteresis characteristics, the logical circuits must discriminate between the small and large potentials resulting when different storage conditions are interrogated. The small potential represents an undesired noise impulse, which tends to limit the reliability of logical circuits.

It is, accordingly, an object of the invention to provide improved logical magnetic circuits.

A more specific object of the invention is to improve the reliability of logical magnetic circuits by decreasing their sensitivity to noise impulses.

In accordance with the present invention, therefore, logical circuits are made less sensitive to noise impulses by introduction of balanced circuit techniques into bistable magnetic circuits. Thus, several cores having windings connected in a balanced circuit will produce equal and opposite noise impulses and may be coupled together in the manner afforded by the invention to produce logical results.

One embodiment of the invention, therefore, comprises a balanced logic circuit for performing the inhibit function. This circuit has a first bistable magnetic element coupled to receive binary information. A second element is coupled to receive a conditioning signal, and a transfer circuit is provided for inhibiting the transfer of information of one polarity from the first element to a third element depending upon the state of the second element as determined by the presence or absence of the conditioning signal.

A further logical circuit is provided as another embodiment of the invention. This circuit includes four magnetic binary elements connected with input windings in two balanced circuit branches. Two of the elements which aid in the logical operations have equal and opposing windings connected in different ones of the circuit branches. The other two elements serve as input elements. Thus, as current is sent in a single direction through the balanced circuit branches, any noise signals are balanced out. Different types of logic may be performed by sequencing of the read-in and read-out signals at the different elements and the choice of polarity of read-in and read-out excitation. For example, the Exclusive Or logical function is performed in this type of circuit by passing current commonly through the two branches and respective windings on the two input elements so that each input element will tend to arrive in the same storage state. The two logical elements have windings connected in each branch such that they tend to arrive at opposite storage states. Thus, if the input elements have like storage, the current in the two branches is balanced and no change in storage state of the two logical elements occurs. If opposite storage states occur in the input elements, however, the current is unbalanced and one or the other of the logical elements changes state. Therefore, a change in storage state of either logical element will indicate the existence of an Exclusive Or relationship of the signals stored in the input elements.

Other features and objects of the invention will be described throughout the following more detailed description of the invention and illustrated in the accompanying drawings, in which.

Figure 1:
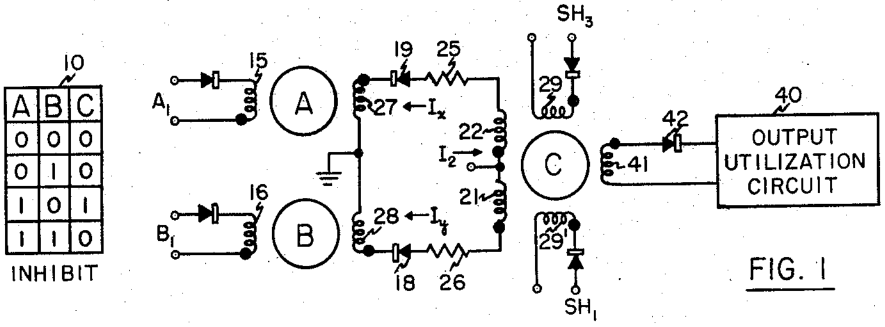
Fig. 1 is a schematic diagram and accompanying truth table of a logical inhibit circuit embodying the invention.

Throughout the drawing like reference characters are used to identify similar features to facilitate comparison of the several figures. In order to more clearly point out the nature of the invention, those well known circuits which are used to obtain the necessary input signals and driving current pulses are not illustrated. The necessary circuit operating conditions are set forth however in connection with illustrative waveforms so that the invention and its mode of operation may be clearly understood.

In order to follow the description of the invention more readily, the notation and background material used in connection with the schematic circuits is explained before proceeding with the detailed analysis of the different circuits. Thus, the information of opposite polarities to be stored in the binary elements is arbitrarily designated in the binary notation 1 and 0. The magnetic binary elements are shown as circles, and it is assumed that these represent magnetic cores presenting rectangular hysteresis characteristics. Such cores tend to remain in a remanence condition of polarity 1 or 0 after being driven into corresponding magnetic saturation. These materials and their characteristics are well known in the art and may be found described in such publications as the Transactions of the American Institute of Electrical Engineers for November 1953 in the article by Joseph Wylen entitled "Pulse Response Characteristics of Rectangular-Hysteresis-Loop Ferromagnetic Materials."

Each of the magnetic cores is supplied with windings for producing a magnetic flux therein in response to current flow. The dot notation is used to designate the polarity of the windings. Thus, as current flows into a dotted winding terminal, the core will tend to store a 0. Conversely, if the current flows into an undotted winding terminal, the core will tend to store a 1. The signals, storage conditions and currents are designated by appropriate letters supplied with subscript numbers which designate a relative sequential time period. Thus $A_1$ indicates the signal arriving at element A during the first time period of a sequence of time periods. Likewise $I_2$ indicates current flowing in the second sequential time period. A primed notation A' indicates the logical Not operation or an inversion of the signal or storage state.

The inhibit function performed by the circuit of Fig. 1 is described in the truth table 10. Thus, input signals A and B may arrive in any of the four illustrated combinations to produce the output signal C representing the inhibit function. By comparing the signals A, B and C it is evident that when the signal A is 1 it can only result in a signal of C equal to 1 when signal B is 0. Thus, when signal A is 1 and also signal B is 1 signal C is 0. Accordingly, the signal B prevents the signal A=1 from progressing to C and thus B may be termed the inhibit signal.

Each of the two input current signals arriving at windings 15 and 16 respectively of cores A and B will, when present, establish a storage condition 1 during the first time sequence period. Considering together the waveforms of Fig. 5 and the diagram of Fig. 1, it is seen that the signals $A_1$ or $B_1$ may be selectively derived from the periodic current pulses $I_1$ by any suitable logic or computer type circuitry. The next sequential operation occurs during a second sequential time period and the current pulses $I_2$ may be used directly. A third sequential step is used to interrogate or shift-out the stored logical result from the circuit. This shift operation may occur at either a further time period three as derived from the current $I_3$ or may occur at the next succeeding time period one as derived from $I_1$. This latter operation is preferred where it is desired that only two time periods be spent for completing the logical operation. However, to better separate the different logical steps throughout the ensuing description, the shift is designated to occur during the third time period of $I_3$.

The shift signal SH may arrive at the same time as the input signals $A_1$ or $B_1$ because of the balanced circuit construction. The rectifiers 18 and 19 prevent current from flowing in the loop $I_x$—$I_y$ from potentials induced in any of the windings 21, 22, 27 or 28. Thus, in the absence of current $I_2$, signal transfer cannot occur from one element to another, and therefore inhibiting circuits are not necessary for preventing unwanted signal transfer from one core to another in performance of the operations during time periods other than that in which current $I_2$ is flowing.

After the elements A and B have stored the incoming signals, the logical transfer to element C occurs by action of current flow $I_2$. The current $I_2$ separates through two branch current paths $I_x$ and $I_y$. Diodes 18 and 19 are supplied in each current path to assure that current flows in a single direction through the two branch paths, which direction is chosen depends upon the orientation of the diodes. A change in diode orientation may require a corresponding change in winding polarities for windings 21 and 22 as well as for windings 27 and 28. Thus, it is seen that the current enters the two windings 21 and 22 of element C so that equal and opposing flux is set up in element C when the paths are balanced for equal current flow. The resistors 25 and 26 serve to equalize any slight unbalanced conditions caused by variations in circuit parameters. Each of the transfer windings 27 and 28 about the respective input elements A and B is connected to establish the same 0 storage state in response to current $I_2$. Accordingly, when both elements A and B are in the same storage state 0—0 or 1—1 the current flow in branches $I_x$ equals the current flow in branch $I_y$ and the storage state of element C remains unchanged.

Whenever elements A or B are in the 1 state, the current $I_2$ causes either or both of them to switch to the 0 state. This action is similar to the conventional interrogation or shift operation in reading out information stored in magnetic bistable state elements. However, in conventional circuits, and in each core A or B of this circuit, an unwanted noise impulse occurs in any core driven from the 0 remanence state to the 0 saturation condition. In conventional circuits this noise is transmitted over the same signal path as the desired signal pulse of higher amplitude occurring when a 1 is stored in the element and it is driven to 0 saturation. With the present balanced circuit, however, it is evident that any noise impulse generated in element A is cancelled or opposed by a similar noise impulse generated in element B so that the net result due to current through windings 21 and 22 is the absence of any noise transfer to element C. It has been observed that the balanced circuit of this invention is self balancing. That is, there is no tendency for one element A to produce a different noise impulse amplitude or shape than the other element B, for any tendency to differ is immediately opposed by the inherent balancing action of the circuit. The balanced circuit has also been found reliable over much greater ranges of currents than tolerable with unbalanced circuits. This may result from a noise elimination device used to reduce noise in the unbalanced type of circuit, since such device in general is designed to compensate for the noise at a particular current value. Accordingly, the balanced circuits afforded by this invention have been found to be more reliable in operation than unbalanced circuits even when they include noise reducing techniques.

Figures 5, 6, 7:
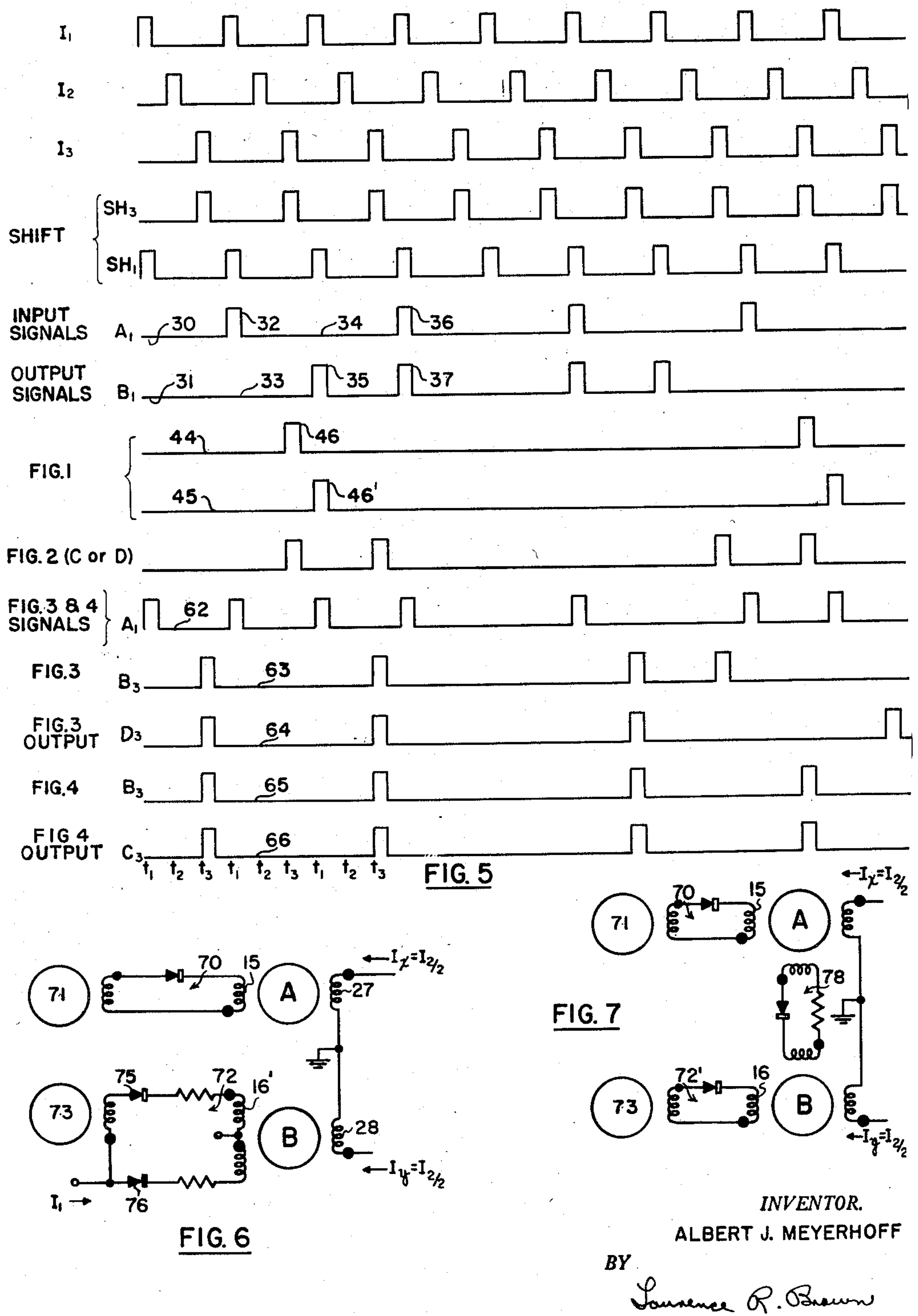
Fig. 5 is a waveform diagram indicating operating conditions of the various illustrated embodiments of the invention.
Figs. 6 and 7 are partial schematic diagrams illustrating optional circuit techniques for incorporation with circuits embodying the invention.

Now consider the inhibit logic produced by circuit action of Fig. 1 under the various input signal conditions of Fig. 5. As the initial $A_1$ signal 30 arrives along with the initial $B_1$ signal 31 both elements A and B are caused to remain in their respective 0 storage states. Element C is in a 0 state because of prior read-out by the shift signal SH at either winding 29 or 29'. The shift signal is used to read the logical result from element C into the output utilization circuit 40 by way of output winding 41. As indicated by the respective output signal waveform charts 44 and 45 of Fig. 5, read-out may occur at either the first or third time periods. This is accomplished by polarization of the read-out winding 41 and diode 42 to pass a signal only when the element C is switched from the 1 to the 0 storage state. Then either of the shift signals $SH_1$ or $SH_3$ may be employed as desired to restore element C to the 0 state and produce an output logical result when the element resides in the 1 state.

The element C resides unchanged in the 0 state in the presence of the same storage state in both elements A and B, as hereinbefore discussed, and therefore produces a 0 read-out signal to the output circuit 40. This occurs for input signal conditions 30—31 or 36—37 as shown in Fig. 5. However, if A and B contain different information, 32—33, the state of element C is switched to 1 by the resulting unbalanced current flow through windings 21 and 22. Consider the input signals 32—33 which place only element A in the 1 state. Since current in branch $I_x$ will tend to switch element A to the 0 state, a higher switching voltage results in element A than in element B so that greater current flows in branch $I_y$. The resulting greater current flow in winding 21 will switch element C to the 1 state so that the output signals 46 or 46' are produced in response to interrogation of element C. Thus, since the inhibit signal $B_1$ is missing the 1 in element A is transferred to the output circuit 40.

Conversely, if the signals 34—35 exist, where only the inhibit signal $B_1$ is present, the switching of element B will cause more current to flow through winding 22 and cause element C to remain in its 0 state. Thus, the presence of inhibit signal $B_1$ causes the 0 of signal $A_1$ to remain a 0. Since when both elements A and B are 0, the element C remains 0, as hereinbefore explained, it is clear that the presence of a 1 at element B inhibits the transfer of a 1 from element A to element C. The circuit, therefore, performs the logical inhibit function with the attendant advantages of high reliability afforded by the balanced current paths.

Figure 2:
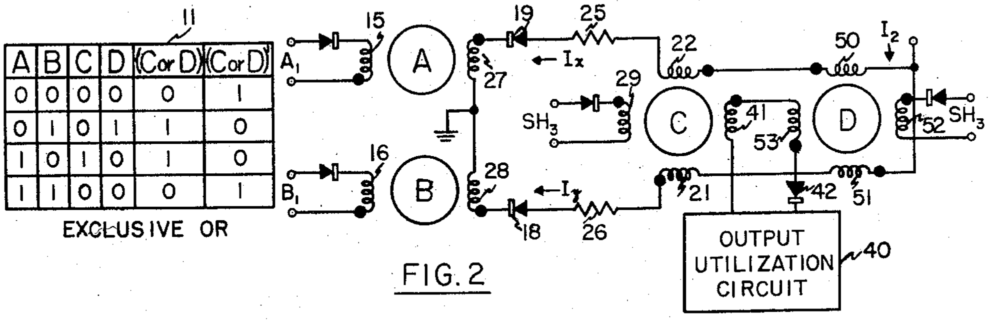
Fig. 2 is a schematic diagram and accompanying truth table of a logical Exclusive Or circuit embodiment of the invention.

The more complex Exclusive Or function of Fig. 2 is indicated in table 11 by the column (C or D). The Exclusive Or circuit therefore serves to produce output signals responsive to the presence of one and only one signal at elements A and B. The inverse of the Exclusive Or function is the material equivalence function of column (C or D)′.

It is readily seen that the circuit of Fig. 2 is a balanced circuit which therefore affords the same reliable noise-free operation hereinbefore described. In order to produce the Exclusive Or function, the signals at both elements A and B must be inhibited by the signal at the other element as may be seen by comparing the C and D signals of chart 11 and noting that they both represent the inhibit action explained in conenction with Fig. 1. Accordingly, two inhibit circuits are combined by supplying an additional element D similar to element C with balanced and opposing windings 50 and 51 but with windings 22 and 50 or 21 and 51 in the same current branches connected in opposite sense. The same relationship, therefore, occurs with signals A, B and C of chart 11 as existed in the chart 10 of Fig. 1, and the circuit operation of Figs. 1 and 2 in obtaining signal C is identical. Signal D is derived in the same manner except that signals at element A inhibit those at element B. The shift winding 52 of element D is actuated simultaneously with shift winding 29 of element C to produce in the series windings 41 and 53 a single output signal (C or D) as shown in the waveforms of Fig. 5. The signal appears at the output circuit 40 in response to switching of either element C or D from the 1 to the 0 state. This occurs only in the presence of a shift signal to develop a signal in winding 41 or 53 of that polarity which will pass through diode 42.

A cycle of operation for Fig. 2 would include the reading in of signals $A_1$ and $B_1$ into magnetic elements A and B, respectively, at time $t_1$. In the trivial case when $A_1$ and $B_1$ are 0, the interrogation current pulse $I_2$ will split into two current paths $I_x$ and $I_y$. Element A will present the same impedance to current $I_x$ as element B presents to current $I_y$, so the current flowing through winding 21 is substantially equal to that flowing in winding 22, leaving element C in its 0 state. Similarly element D remains in its 0 state during the presence of interrogating current $I_2$. The application of shift pulses $SH_3$ to windings 29 and 52 will fail to produce an output in output utilization circuit 40. In a similar manner, when both elements A and B are in their respective 1 states, current path $I_x$ is impeded substantialy the same as current path $I_y$ is impeded so that neither element C nor element D changes its magnetic remanent state. Consequently when shift pulse $SH_3$ is applied to windings 29 and 52, no output signal is transmitted to output utilization circuit 40.

When element A is switched to its 1 state by the presence of an $A_1$ signal but element B remains in its 0 state due to the absence of a $B_1$ signal, the element A presents a higher impedance to current path $I_x$ than element B presents to current path $I_y$, so more current is available in branch $I_y$ than is available to branch $I_x$. As a consequence element C is switched to its 1 state and element D is merely driven further into negative saturation and its 0 remanent state does not change. The occurrence of shifting pulse $SH_3$ will switch element C to its 0 state to produce an output pulse across output winding 41. In a similar manner, when input signal $B_1$ exists but input signal $A_1$ is absent, current path $I_y$ is impeded more than current path $I_x$, so that element D switches to its 1 state and element C remains in its 0 state during the occurrence of interrogating current pulse $I_2$. When shift pulse $SH_3$ occurs, it will be the switching of element D that produces an output signal across winding 53 for output utilization circuit 40. The circuit shown in Fig. 2 carries out the "Exclusive Or" logic symbolically represented in the truth table accompanying Fig. 2.

In order to produce the material equivalence function (C or D)′ which represents two like input quantities 0—0 or 1—1, the Exclusive Or output signal is merely inverted. Circuits capable of inverting such signals are well known in the art. The copending application of Robert W. Avery for Logical Circuits, filed December 4, 1952, Serial No. 324,118, describes and claims certain inverting circuits using magnetic cores. Thus it is seen that the balanced circuits of this invention may serve as the basis for different types of logical operation.

Figure 3:
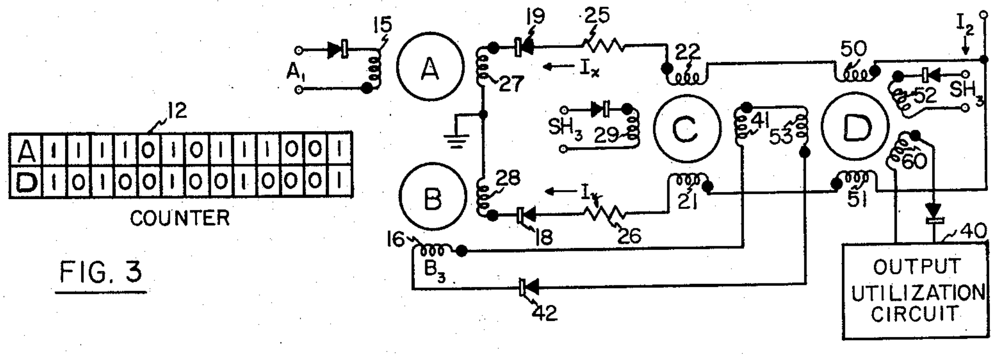
Figs. 3 and 4 are schematic diagrams together with accompanying truth tables of counter circuits embodying the invention.

Another circuit embodiment of the invention, as illustrated in Fig. 3, is a binary counter. As seen from the truth table 12, when a series of input signals A is present, an output signal D occurs for every other 1 input. Thus, the circuit provides at the output circuit 40, during the third time period, signals developed by shift current $SH_3$ in the output winding 60. The output signals represent a reliable binary count derived from randomly interspersed 0—1 signals $A_1$ arriving during the first time period.

This binary counter circuit is an Exclusive Or circuit having a feedback path for providing the signals $B_3$ from the Exclusive Or result excited at either winding 41 or 53 in response to the shift current $SH_3$. Since the binary count signal is derived solely from element D, the separate output winding 60 is provided. Consider the circuit operation of Fig. 3 when the signal sequence 62 of Fig. 5 representing the input signal pulses $A_1$ is applied to winding 15 of magnetic element A. The first $A_1$ signal pulse switches element A to its 1 state. Element B receives no input pulse and remains in its 0 state. As was explained in connection with the circuit operation of Fig. 2 when dissimilar inputs exist in elements A and B, interrogation current $I_x$ finds a different impedance to its flow than current path $I_y$. With element A in its 1 state and element B in its 0 state, unbalanced current flow through windings 50 and 51 takes place curing interrogation current pulse $I_2$, causing element D to switch to its 1 state and element C to remain in its 0 state. The subsequent application of a shift pulse to windings 29 and 52 of elements C and D, respectively, produces an output pulse $D_3$ to the utilization circuit 40 via winding 60. In addition, the switching voltage developed across winding 53 of element D causes current pulse $B_3$ to flow in a feedback loop comprising winding 53, diode 42 and windings 16 and 41. Current pulse $B_3$ swtches magnetic element B to its 1 state, but does not affect the state of element C since the M. M. F. being applied to element C by current $B_3$ flowing into the undotted terminal of winding 41 is overcome by the M. M. F. being applied to element C by the shift current pulse $SH_3$ flowing into the dotted terminal of winding 29.

In the next cycle of operation, the $A_1$ signal pulse again switches core A to its 1 state. Magnetic element B is in its 1 state as a result of the feedback current pulse $B_3$ produced in the preceding cycle. At the time $t_2$ of the next interrogation period, magnetic elements C and D remain unchanged in their respective 0 states because of the equality of branch current paths $I_x$ and $I_y$ existing when elements A and B are each in the same magnetic remanent state. The subsequent shift pulse $SH_3$ produces no output to the utilization circuit during the third sequential period. At the end of the third sequential step all the magnetic elements A, B, C and D are in their respective 0 states. In the succeeding cycle, the presence of an input signal $A_1$ will result in an output signal from the counter circuit when elements A and B are interrogated.

The above description has been applied to a binary counter wherein $A_1$ pulses occur periodically. The binary counter forming this invention may operate just as well when the $A_1$ pulses occur randomly. Assume that in a cycle just completed, an $A_1$ signal pulse has occurred and that an output pulse was applied to the utilization circuit and a 1 was stored by a feedback circuit to element B. Magnetic elements A, C and D are in their respective 0 states and element B is in its 1 state. Since $A_1$ may occur randomly, it will also be assumed that an $A_1$ signal pulse has not occurred before the next interrogation period. At the interrogation period, branch current $I_x$ exceeds branch current $I_y$ and element C switches to its 1 state. The subsequent application of a shift pulse $SH_3$ causes a voltage to be developed across winding 41 of element C, such developed voltage causing current $B_3$ to flow in the feedback loop comprising windings 41, 53, diode 42 and winding 16 and switch element B to its 1 state. No output signal $D_3$ is produced from the counter. Accordingly the output signals $D_3$ of sequence pulses 64 occur as shown in chart 12 only when $A_1=1$ and $B_3=0$. Comparison of output signals $D_3$ with input signals $A_1$ show that for any possible input signal combinations, two $A_1$ signals are required for each output signal $D_3$. Such a device can be used as a binary counter for randomly occurring inputs.

Figure 4:
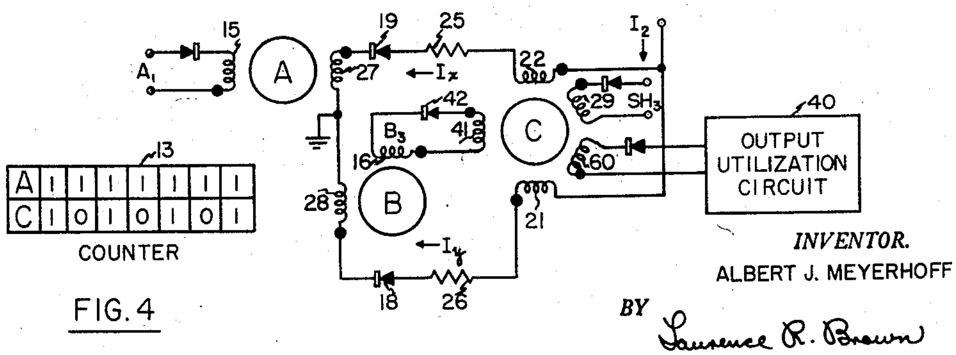

Should periodic input signals occur without interruption as during the first four input pulses $A_1$, of sequence 62, the simplified binary counter circuit of Fig. 4 may be used. In the truth table 13 it is seen that the output signal C occurs for every two periodic input $A_1$ signals. Since $B_3$ signals of the sequence 65 in Fig. 5 are identical with those of sequence 63 during the periodic recurrence of input signals $A_1$ for the first four time sequences, the output signals $C_3$ of sequence 66 represent a true binary count for periodic input signals. However, when the input signals $A_1$ are randomly interspersed 0—1 signals rather than periodic, it is seen that the $B_3$ signals 65 of the Fig. 4 circuit are different from those 63 of the Fig. 3 circuit, resulting in an erroneous binary count during the latter part of the output $C_3$ signal sequence 66. Fig. 4 is that embodiment of the invention which counts 1's that periodically and successively are read into element A. At time $t_1$, $A_1$ signal pulse switches element A to its 1 state. At time $t_2$, interrogating current $I_2$ splits into current paths $I_x$ and $I_y$, switching element A to its 0 state and diverting most of the current $I_2$ into the $I_y$ path. As a consequence, element C is switched to its 1 state. At time $t_3$, $SH_3$ pulse is applied and element C switches to its 0 state, producing an output pulse to output utilization circuit and also inducing a voltage in winding 41 to switch element B to its 1 state. The output pulse so produced is not a binary output but is the output that starts the count of successive 1's being fed into element A, and such output pulse must discriminate from the output pulses that are to follow.

When the next cycle begins, a 1 is placed in element A. Interrogation pulse $I_2$ finds elements A and B in their respective 1 states so element C remains in its 0 state, elements A and B being read out to their respective 0 states. The next $SH_3$ pulse applied to element C will not produce an output pulse to output utilization circuit 40. Another 1, or the third successive 1, is read into element A, such 1 being read into element C during interrogation $I_2$ and producing a 1 in element B and an output from element C during the application of a $SH_3$ pulse to element C. Consequently, a binary count is obtained wherein every two successive 1's in A (discounting the very first 1) produces an output in output utilization circuit 40. This sequence of one output for two inputs takes place because a 1 is stored alternately in element B and such a 1 in B serves to inhibit alternate 1's in element A.

The circuit of Fig. 4 will not operate when the A signals are not repetitive. If a 0 is interspersed with the 1's element B will not have a 1 read into it through the loop consisting of winding 41, diode 42 and winding 16 when the 0 in element A is interrogated. Consequently a 0 in B will prevent B from serving its inhibit function when the next 1 is read into element A. Such failure to inhibit will cause an undesired output to be produced in output utilization circuit 40 when a 1 is next read into element *a*.

Under certain signal conditions in operation of the balanced circuits of the invention, it is desirable to take circuit precautions to prevent noise signals from being induced in the circuits supplying the input signals $A_1$ or $B_1$. Thus, if the signals $A_1$ or $B_1$ come from preceding magnetic logic elements coupled by a single diode transfer loop 70 as shown in Fig. 6, the element 71 might receive an unwanted noise impulse. This noise impulse has a tendency to occur when elements A and B are in the 1—1 state. In this condition the switching current in each of the branches $I_x$ and $I_y$ will be half of $I_2$ as contrasted with the very much less switching current at either element A and B during the unbalanced signal conditions 0—1 or 1—0. This causes the elements A and B to switch very quickly and thus induce a high potential in the input windings 15 and 16. In the single diode loop 70 this induced potential is in such direction that current flows which will tend to switch element 71 into its 0 state thus tending to destroy any information stored therein when it resides in the 1 state.

Several precautionary measures may be taken to prevent the backward travel of noise from elements A or B into elements 71 or 73. One simple remedy is the use of a split winding transfer circuit 72, as shown in Fig. 6 of the type described in the copending applications of John O. Paivinen, one entitled, Magnetic Device, filed March 31, 1954, Serial No. 420,135 and the other entitled Magnetic Shift Register, filed December 7, 1953, Serial No. 396,603, which applications describe and claim utilization of split windings in the transverse circuits coupling magnetic cores. In this circuit as in the hereinbefore described balanced circuits, circulating current is prevented by the diodes 75 and 76 in the absence of the transfer current $I_1$ and therefore the circuit path 72 is not open during the time interval that potential is induced in the winding 16' from the current $I_2$.

The circuit of Fig. 7 provides a loading circuit 78 for coupling the two elements A and B so that a high circulating current exists when both elements are switched at the same time. This loads down the elements A and B so that they take longer to switch and therefore the potential induced in windings 15 and 16 is much less. Accordingly, the single diode transfer loops 70 and 72' may be used to couple the input signals to elements A and B.

From the foregoing description of the invention and its mode of operation, it is evident that logical functions may be derived advantageously with the improved balanced binary magnetic circuits. Those features of novelty believed descriptive of the nature of the invention in its various forms are therefore described with particularity in the appended claims.

What is claimed is:

1. A circuit for performing the logical function A. B' (A And Not B), said circuit comprising: A and B magnetic transferor cores each capable of assuming either of two stable states of magnetic remanence one of which is a reference state, each core having but two windings one winding of which is for receiving input signals and the other of which serves both as a read-out switching winding and also as an output winding; a magnetic transferee core capable of assuming either of two stable states of magnetic remanence one of which is a reference state, said transferee core having a center-tapped read-in switching winding; means, including a first asymmetrical conducting device, connecting one end of said A core read-out winding to one end of said transferee-core read-in winding; means, including a second asymmetrical conducting device, connecting one end of said B core read-out winding to the other end of said transferee-core read-in winding; means connecting together at a common junction the other ends of said read-out windings of said A and B cores, thereby to form a loop interconnecting said A, B and transferee cores, said first and second asymmetrical conducting devices being poled to prevent current flow around said loop; means for connecting a voltage pulse source between said common junction of said read-out windings and said center tap of said read-in windings, thereby to divide said loop into two branch paths, one of said branch paths including said A core read-out winding, said first asymmetrical conducting device and one section of said tapped read-in winding, and the other of said branch paths including said B core read-out winding, said second asymmetrical conducting device and the other section of said tapped read-in winding, said read-out and read-in windings being wound in such sense that said voltage pulse source drives a current pulse through said one section of said read-in winding and through said A core read-out winding in a direction tending to switch said transferee core and also said A core to their respective reference states, and drives another current pulse through said other section of said read-in winding and through said read-out winding of said B core in a direction tending to switch said transferee core to the state other than its reference state but tending to switch said B core to its reference state, the circuit parameters being such that if neither or both of said A and B cores switch in response to said current pulse through its respective read-out winding, then the current pulses through said two sections of said read-in winding apply substantially equal and opposing magnetizing forces to said transferee core, whereas if only one of said A and B cores switch in response to said current pulse through its respective read-out winding, then the back voltage induced in the read-out winding of the core which switches is effective to cause unequal currents to flow through said two sections of said read-in winding, whereby unequal magnetizing forces are applied to said transferee core tending to switch said transferee core either to said reference or said other state according to whether said A or B core is switching; and means, including an additional winding on said transferee core, for developing an output signal indicating that said transferee core was switched to said other state.

2. Apparatus as claimed in claim 1 characterized in that said means for developing an output signal includes means for switching or tending to switch said transferee core to said reference state, thereby to induce a voltage in said additional winding in response to the actual switching of said transferee core to said reference state.

3. A circuit for performing the logical function A.B′ (A And Not B), said circuit comprising: first, second and third magnetic cores each capable of assuming either of two stable states, one of which is a "set" state and the other a "reset" state; an input winding coupled to each of said first and second cores for placing said cores in said "set" state in response to an input signal applied to its respective input winding; a single additional winding coupled to each of said first and second cores, said additional winding functioning both as a read-out switching winding and as an output winding for its respective core; a read-in switching winding coupled to said third core, said read-in winding having a tap dividing said read-in winding into two sections; a first asymmetrical conducting device connecting one end of said read-in winding to one end of said additional winding of said first core; a second asymmetrical conducting device connecting the other end of said read-in winding to one end of said additional winding of said second core; means connecting together at a common junction the other ends of said additional windings of said first and second cores, thereby to form a loop interconnecting said first, second and third cores, said first and second asymmetrical conducting devices being opposingly poled to prevent current flow around said loop; voltage pulse means connected between the tap of said read-in winding and said common junction of said additional windings, thereby to divide said loop into an upper and a lower branch path, said first-core additional winding being in said upper path, said second-core additional winding being in said lower path, said additional windings and said read-in winding being wound in such sense that the current driven through said upper branch by said voltage-pulse means tends to switch said first and third cores to said "reset" state, whereas the current through said lower branch tends to switch said third core to said "set" state and said second core to said "reset" state, the circuit parameters being such that if neither or both said first and second core switch to the "reset" state in response to the current driven through said additional windings by said voltage pulse, then the currents flowing through the two sections of said read-in winding apply substantially equal and cancelling magnetizing forces to said third core, whereas if one only of said first or second core switches in response to said current flowing through its additional winding, then the voltage induced in said additional winding by said switching is of a polarity tending to reverse bias one of said asymmetrical conducting devices and forward bias the other, whereby the current flowing through the two sections of said read-in winding apply unequal magnetizing forces to said third core and said third core switches or tends to switch to either said "set" or "reset" state depending upon whether said unequal magnetizing forces resulted from the switching of said first or said second core.

4. Apparatus as claimed in claim 3 characterized in that means are provided for detecting whether said third core was switched to said "set" state in response to said currents flowing through said read-in winding.

5. Apparatus as claimed in claim 4 further characterized in that said detecting means comprises means for switching or tending to switch said third core to said "reset" state, and an output winding for sensing the actual switching of said third core to said "reset" state.

References Cited in the file of this patent

UNITED STATES PATENTS

| | | |
|---|---|---|
| 2,686,819 | Booth | June 8, 1954 |
| 2,719,773 | Karnaugh | Oct. 4, 1955 |
| 2,738,874 | Wilson et al. | Mar. 20, 1956 |
| 2,741,758 | Cray | Apr. 10, 1956 |